(12) United States Patent
Paasonen et al.

(10) Patent No.: US 12,505,323 B2
(45) Date of Patent: Dec. 23, 2025

(54) OPTICAL DATA READER WITH MULTI-LANE CONVEYOR

(71) Applicant: Microsoft Technology Licensing, LLC, Redmond, WA (US)

(72) Inventors: Krista Anna Alice Paasonen, Espoo (FI); Julie Wilmien Visser, Cambridge (GB); Esa Tapani Raikkonen, Espoo (FI); Philip Athelstan Wainman, Bishops Stortford (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/621,421

(22) Filed: Mar. 29, 2024

(65) Prior Publication Data

US 2025/0307581 A1   Oct. 2, 2025

(51) Int. Cl.
*G06K 7/10* (2006.01)

(52) U.S. Cl.
CPC ..... *G06K 7/10871* (2013.01); *G06K 7/10603* (2013.01); *G06K 7/10831* (2013.01)

(58) Field of Classification Search
CPC ........... G06K 7/10871; G06K 7/10603; G06K 7/10831; G06K 7/10; G06K 7/14
USPC ................. 235/454, 487, 375, 439
See application file for complete search history.

(56) References Cited

U.S. PATENT DOCUMENTS

| | | | |
|---|---|---|---|
| 4,989,191 A | 1/1991 | Kuo | |
| 11,947,094 B1* | 4/2024 | Prentice | ................. H04N 23/90 |
| 2005/0146808 A1 | 7/2005 | Hoelsaeter | |
| 2005/0185160 A1* | 8/2005 | Kuit | ...................... G03F 7/7075 |
| | | | 355/72 |
| 2006/0102599 A1* | 5/2006 | Adams | ............... B23K 26/0738 |
| | | | 219/121.73 |
| 2006/0146658 A1 | 7/2006 | Russ | |
| 2006/0161934 A1 | 7/2006 | Klein | |
| 2007/0253042 A1 | 11/2007 | Szarvas | |
| 2011/0114729 A1* | 5/2011 | Moon | .............. G06K 19/06084 |
| | | | 235/454 |
| 2020/0029478 A1* | 1/2020 | Kawai | .................. H05K 13/081 |
| 2020/0134773 A1* | 4/2020 | Pinter | ................ G01N 21/8806 |

(Continued)

FOREIGN PATENT DOCUMENTS

| | | |
|---|---|---|
| CN | 1161759 A | 5/2002 |
| CN | 103482321 A | 1/2014 |

(Continued)

*Primary Examiner* — Edwyn Labaze

(74) *Attorney, Agent, or Firm* — Alleman Hall & Tuttle LLP

(57) ABSTRACT

An optical data reader comprises a conveyor, an optical system, and a controller. The conveyor is configured to move a plurality of optical substrates along a plurality of lanes. Each optical substrate includes a plurality of waveplates arranged along its direction of movement within any of the plurality of lanes. The optical system is configured to observe one or more of the waveplates in its field-of-view; the optical axis crosses the plurality of lanes such that movement of at least one of the optical substrates brings one or more different waveplates into the field-of-view. The controller is coupled operatively to the conveyor and configured to control the position of the optical substrate in each occupied lane.

20 Claims, 9 Drawing Sheets

(56) References Cited

U.S. PATENT DOCUMENTS

2023/0048789 A1    2/2023   Hirano
2023/0199310 A1*   6/2023   Trajkovic ............. H04N 23/676
                                                            348/345

FOREIGN PATENT DOCUMENTS

| KR | 20050037278 A | 4/2005 |
| KR | 101197311 B1  | 11/2012 |

* cited by examiner

OPTICAL DATA READER WITH MULTI-LANE CONVEYOR

BACKGROUND

High-power, short-pulse, laser radiation can be used to write and store data in a dielectric optical substrate. The radiation induces, at its focus, long-lived or permanent structural and optical changes within the substrate due to non-linear (e.g., two-photon) absorption by the substrate medium. In some cases, a nanoscale 3D structure with grating-like optical properties is formed at the focus. The term 'voxel' is used herein to refer to an individual locus of this or any other optical change within an optical substrate, which is useful for storing data.

SUMMARY

One aspect of this disclosure relates to an optical data reader comprising a conveyor, an optical system, and a controller. The conveyor is configured to move a plurality of optical substrates along a plurality of lanes. Each optical substrate includes a plurality of waveplates arranged along its direction of movement within any of the plurality of lanes. The optical system is configured to observe one or more of the waveplates in its field-of-view; the optical axis crosses the plurality of lanes such that movement of at least one of the optical substrates brings one or more different waveplates into the field-of-view. The controller is coupled operatively to the conveyor and configured to control the position of the optical substrate in each occupied lane.

Another aspect of this disclosure relates to a method to read data encoded optically within an optical substrate. The method comprises: (a) moving a plurality of optical substrates along a plurality of lanes, each optical substrate including a plurality of waveplates arranged along its direction of movement; (b) observing one or more of the waveplates in a field-of-view of an optical system arranged about an optical axis, the optical axis crossing the plurality of lanes such that movement of at least one of optical substrates brings one or more different waveplates into the field-of-view; and (c) controlling the conveyor so as to control a position of the optical substrate in each occupied lane.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any disadvantages noted in any part of this disclosure.

DETAILED DESCRIPTION

In certain data storage and retrieval technologies, voxels of encoded data may be written into an optical substrate, arranged along any, some, or all of the Cartesian coordinates. In engineering the arrangement of the written voxels, it may be important to consider the cost of reading back the stored data. For instance, some voxel arrangements may require high-precision positioning of the read optics relative to the optical substrate in all three directions. This disclosure recognizes that stored data can be read back more economically when a greater share of the positioning error is distributed in a single direction (e.g., the X direction herein).

In this approach, a relatively straightforward conveyance mechanism can be used to move the optical substrate in the X direction, while higher-precision positioners are used to adjust the optical axis and focal plane of the read optics. Such methods and configurations reduce both the cost and the physical size of the optical data reader-important technical effects which allow additional readers to be integrated into a data-center, for increased data-reading bandwidth. In some examples, a series of rollers provide alignment as well as motive force for each optical substrate as it traverses the precision-aligned optical system.

Another strategy for reducing the overall cost of reading data stored on optical substrates is to increase the number of substrates that can the optical data reader can handle—i.e., convey across a fixed optical system. This disclosure details a multi-lane conveyor, where the position of each optical substrate within each lane is independently controllable, and where each lane can accommodate a plurality of optical substrates in series.

This configuration increases the data-reading bandwidth in various scenarios, but is especially applicable to data storage and retrieval systems in which a significant portion of the bandwidth is used to verify newly written data. In such a system, the rate of demand for access of 'cold' (pre-existing) data may be relatively low. When such demand occurs, however, it can be met with minimal latency—an important technical effect. Moreover, the ability to transition efficiently between routine verification and on-demand retrieval significantly improves the overall performance of an optical data reader. These configurations and related methods offer the additional technical effect whereby a given optical substrate can be loaded into a holding position and queued for reading even while the reader is engaged in verifying another substrate, for reduced latency through pipelining. In some examples the plural lanes extend to both sides of the optical system, for increased flexibility.

Figure 1:
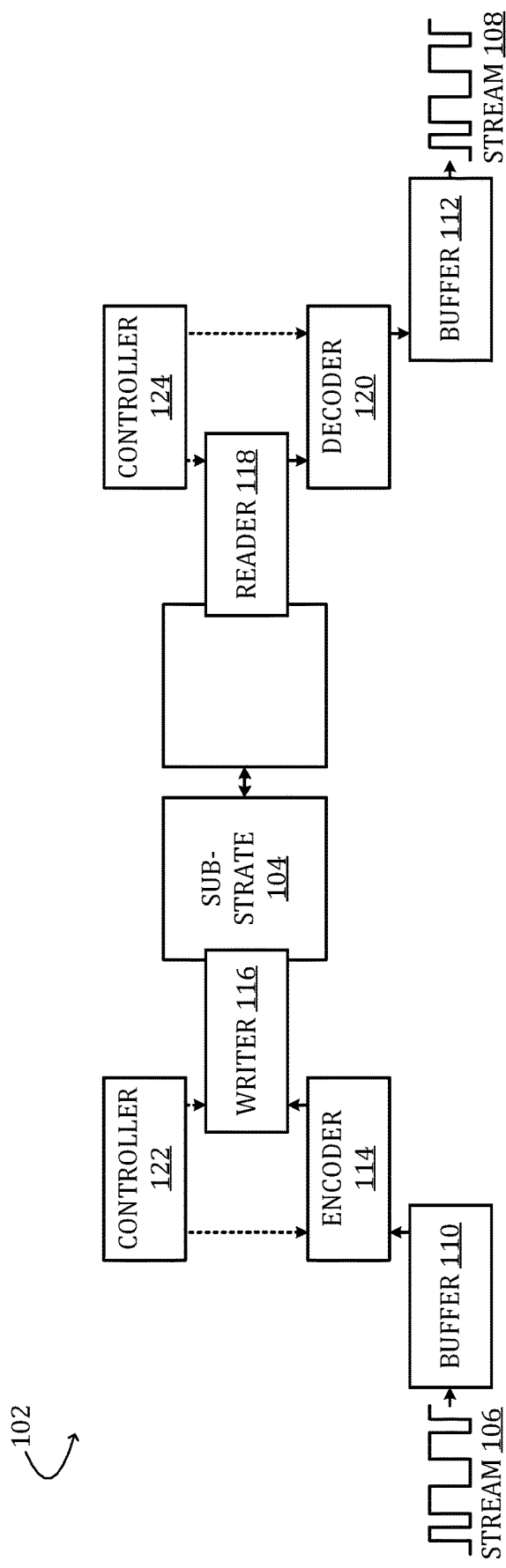
FIGS. 1 and 2 show aspects of an example data storage and retrieval system.
Figure 2:
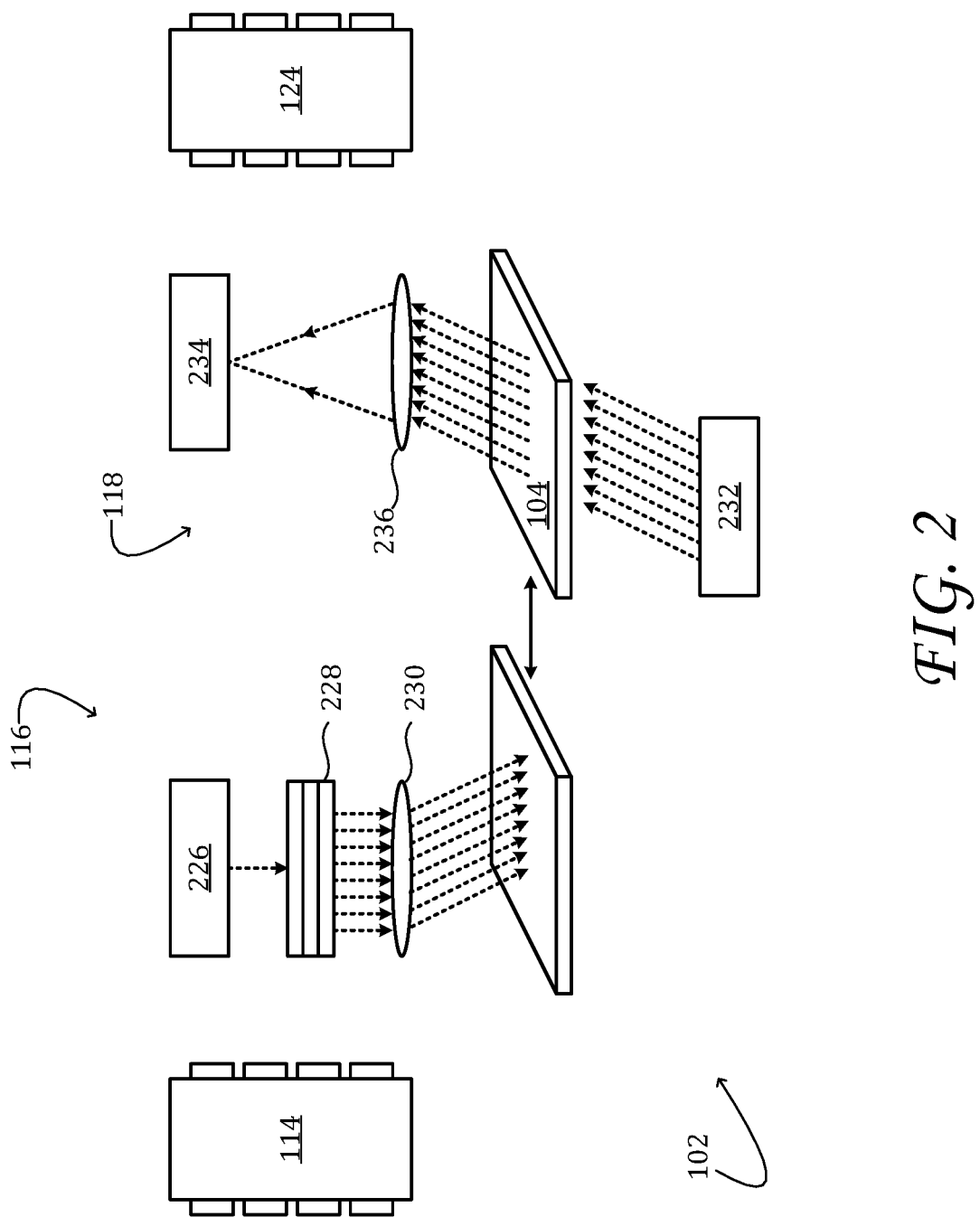

Turning now to the drawings, FIGS. 1 and 2 show aspects of an example data storage and retrieval system 102. The illustrated system is an integrated read-write system, capable of data-storage and data-retrieval operations. Such a system may be used in a data server, for example. Other systems equally consonant with this disclosure may be read-only, the complementary write process enacted elsewhere.

System 102 includes optical substrate 104, which may or may not be removable from the system. The optical substrate may differ from one example to the next, but generally comprises a solid dielectric. In some examples, the optical substrate may comprise an inorganic glass, such as silica glass. In other examples, the optical substrate may comprise a transparent ceramic or a polymer. In some examples, the optical substrate may include a relatively thin layer (e.g., 30 to 300 microns thick) coupled to a mechanically stable supporting layer. In the illustrated example, the optical substrate takes the form of a rectangular slab, but that aspect is not necessary. Alternative geometric forms of the optical substrate include blocks, discs, and so on.

System 102 is configured to receive a write stream 106 of digital data and to release a read stream 108 of digital data. Data from the write stream may be buffered in write buffer 110 prior to being written to optical substrate 104. Likewise, data read from the optical substrate may be buffered in read buffer 112 prior to being released into the read stream. Encoder 114 is configured to enact the logical encoding operation that converts the buffered data into control signal, which is furnished to optical data writer 116. The optical data writer includes componentry that writes the buffered data to the optical substrate in the form of optical perturbations (vide infra) according to the control signal. Optical data reader 118 includes componentry that probes the optical substrate to sense the optical perturbations effected by a previous write operation. In doing so, the optical data reader generates sensory signal, which is received in data decoder 120. The data decoder is configured to enact the logical decoding operation that converts the sensory signal from the optical data reader back into the previously stored data. Write controller 122 and read controller 124 supply, respectively, write parameters to the encoder and optical data writer, and read parameters to the data decoder and reader. In some implementations, controllers 122 and 124 may be combined.

In optical data writer 116, high peak-power, short-pulse laser radiation is used to write and store data in optical substrate 104. In some examples the radiation induces, at its focus, a long-lived or permanent structural perturbation in the optical substrate, due for example to non-linear (e.g., two-photon) absorption by the substrate medium. The term 'voxel' refers to an individual data-storage location comprising this or any other induced perturbation within the optical substrate. A voxel can store data in various forms. In principle, any of the Muller-matrix coefficients of the substrate medium can be manipulated and used to encode data. In some examples, a nanoscale 3D structure with grating-like optical properties is formed at the focus of the radiation. In some examples the optical perturbation written at each voxel can be modeled as a waveplate of a retardance δd and slow-axis orientation φ.

In some examples both the slow-axis orientation and the retardance (the 'birefringence', collectively) are modulated so as to encode data. When data is written in that way, the polarization angle of the write beam determines the orientation φ of the waveplate grating, while the intensity of write beam determines the strength of the grating. In other examples the polarization angle is fixed and only the write beam intensity is modulated. In still other examples the write beam intensity is fixed and only the polarization angle is modulated. By dividing the continuous space of achievable slow-axis orientations and/or retardances into discrete intervals, multi-bit data values can be encoded into each voxel— viz., by independently coercing the birefringence of that voxel to within one of the discrete intervals. In this manner, each voxel may encode one of R different retardance states at each of Q different polarization angles.

Write parameters supplied by controller 122 may define the configuration of voxels of optical substrate 104. In some examples the voxels are arranged in parallel layers spaced within the depth of the optical substrate (e.g., in a direction normal to the read/write surface of the optical substrate). The write parameters may specify the number of layers, the depth of each layer, and/or the detailed arrangement of voxels within any layer.

In the configuration shown in FIG. 2, the radiation source for optical data writer 116 is laser 226. The laser is configured to emit a repeating pulse train of pulsed radiation. The wavelength band of the radiation is not particularly limited, though wavelengths in the range of 350 to 1600 nanometers (nm)—e.g., 515 or 1030 nm—are typical. In some examples the radiation pulses may be sub-picosecond pulses—e.g., tens to hundreds of femtoseconds in duration. The duty cycle of the pulse train is not particularly limited, but pulse frequencies of tens to hundreds of MHz are typical. In some examples, the laser may be one or more of Q-switched and mode-locked, to provide very brief pulses of very high energy. Other forms of laser radiation are also envisaged.

To achieve acceptably high data-writing bandwidth the radiation used to write the data may be split into a plurality of independently modulated write beams, so that a plurality of voxels can be written concurrently. In this approach, the pulse energy of each write beam is controlled independently via multichannel data modulator 228. Encoder 114 provides electronic signal to the data modulator that defines the data to be carried over each write beam. Downstream of the data modulator, each write beam is focused onto a corresponding voxel of optical substrate 104.

Depending on the implementation, portions of optical data writer 116, optical substrate 104, or both may be coupled mechanically to a write-scanner (not shown in FIG. 2). The write-scanner is configured to change the relative positioning of the write beams relative to the optical substrate, so that all of the voxels of a given layer can be addressed. In some examples the beams are scanned in a given direction from a rotating polygon mirror and suitably adapted focusing optics, as the optical substrate moves laterally in another direction. In examples in which data is to be written to a plurality of layers within optical substrate 104, optical data writer 116 may include an adjustable objective-lens system 230. The adjustable objective-lens system is configured to focus the write beams emerging from data modulator 228 to a selected depth layer of the optical substrate.

Optical data reader 118 of data storage and retrieval system 102 includes an optical probe 232 and an optical sensor. The optical sensor, in FIG. 2, takes the form of analyzer camera 234. In some examples the optical probe is a polarized optical probe. The optical probe may include a diode laser, super-luminescent diode laser, or laser-excited fluorescent light source, for instance. In some examples read controller 124 is coupled operatively to the optical probe and configured to control the polarization angle of the optical probe. Analyzer camera 234 may include a high-resolution, high frame-rate CMOS or other suitable photodetector array. The analyzer camera is configured to image light from optical probe 232 after such light has interacted with the written voxels of optical substrate 104. Although FIG. 2 shows transmission of polarized light rays through the optical substrate and into the camera, the light rays may, in alternative configurations, reach the camera by reflection from the optical substrate.

In some examples analyzer camera 234 may resolve, in corresponding pixel arrays of the captured image frames, localized intensity in one or more polarization planes. In examples in which the written voxels have variable phase delay, the analyzer camera may include a switchable or tunable polarization control in the form of a liquid-crystal retarder or Pockels cell. Four images of each portion of optical substrate 104 may be acquired in sequence by the analyzer camera as the polarized optical probe 232 is rotated through four different polarization angles. That process is akin to measuring basis vectors of a multi-dimensional vector, where the 'vector' captures the birefringent properties of the voxels of the imaged portion. In examples in which all voxels have the same phase delay, these features may be omitted.

Depending on the implementation, portions of optical data reader 118, optical substrate 104, or both may be coupled mechanically to a read-scanner (not shown in FIG. 2 but developed in subsequent drawings). The read-scanner is configured to change the relative positioning of optical probe 232 and/or camera 234 relative to the optical substrate, so that all of the voxels of a given layer can be observed. In examples in which data is to be read from a plurality of layers of optical substrate 104, optical data reader 118 may include an adjustable collection-lens system 236. The adjustable collection lens system may collect light rays diffracted from a selected depth layer of the optical substrate, and reject other light rays. In other examples lensless imaging based on interferometry may be used.

Decoder 120 of optical data reader 118 is configured to receive the component images from analyzer camera 234 and to enact the image processing necessary to retrieve the data stored in optical substrate 104. Such data may be decoded according to a canonical method in which an observable physical property is connected through one or more intermediates to the data read from the optical substrate. Alternatively the data may be decoded according via a machine-learning method trained to directly generate decoded data based on component-image data.

Figure 3:
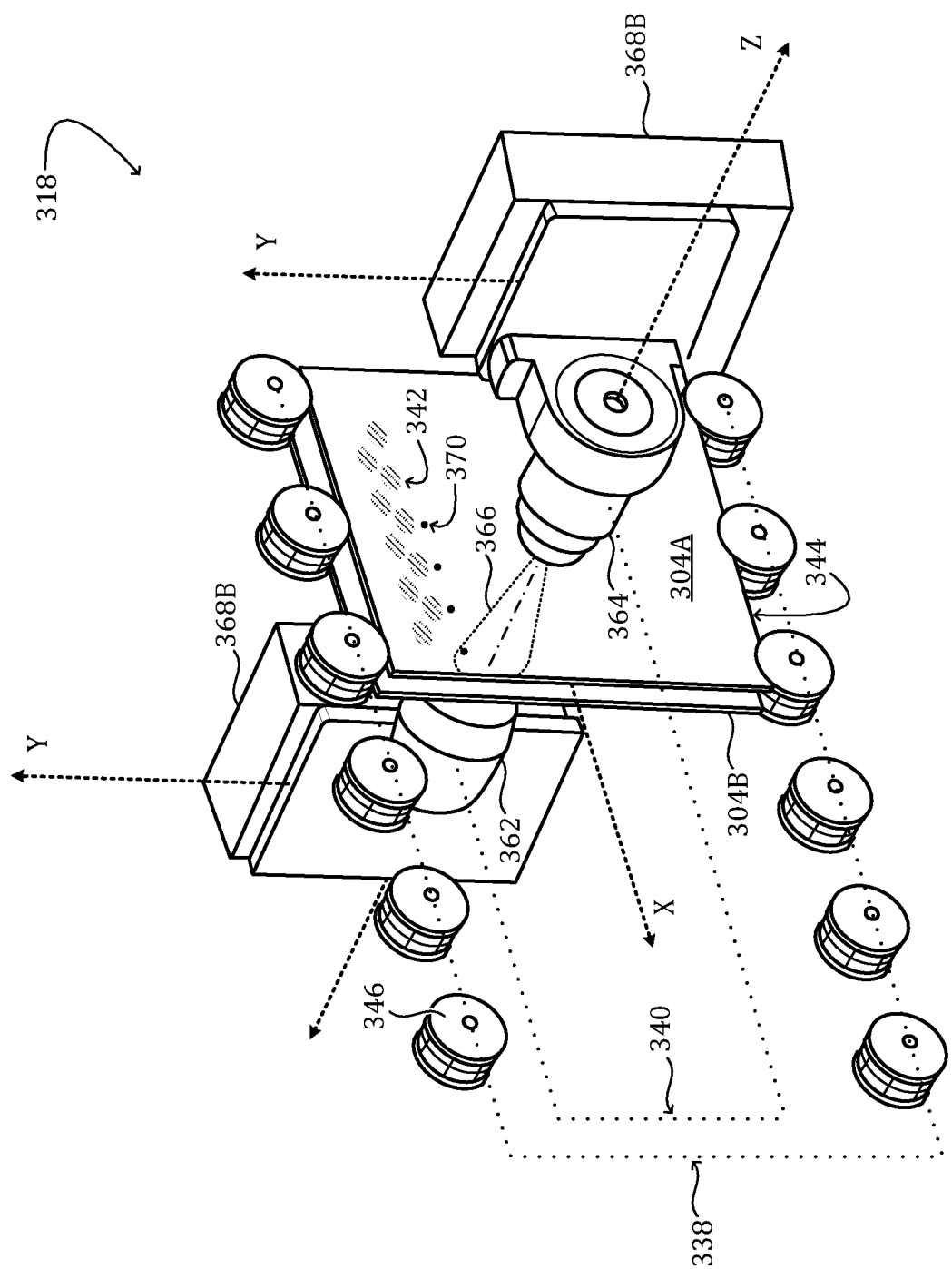
FIG. 3 shows aspects of an example optical data reader.

FIG. 3 shows additional aspects of an example optical data reader 318. This drawing highlights, inter alia, example structural features of the optical data reader introduced above.

Optical data reader 318 includes a conveyor 338 and an optical system 340. The conveyor and optical system are coupled operatively to a suitable controller, such as controller 124 of FIG. 1. Conveyor 338 is configured to move optical substrate 304A in a first direction—viz., the X direction in FIG. 3. In some examples the conveyor may be configured to move the optical substrate forward and backward along that direction. As noted hereinabove, optical substrate 304A includes a plurality of waveplates 342 arranged along the X direction, typically along both the X and Y directions and, in some examples, along the X, Y, and Z directions. More generally the waveplates may be arranged along two or three non-parallel directions.

The detailed configuration of conveyor 338 is not particularly limited. Generally speaking, part of the conveyor is configured to make slideless contact with an edge face 344 or other area of optical substrate 304A. The slideless contact enables the conveyor to move the optical substrate in the first direction. In some examples the slideless contact may comprise the contact between the edge face of an optical substrate and a conveyor belt or rail (not shown in the drawings), or other apparatus configured to grip the edge face or other area.

Figure 4:
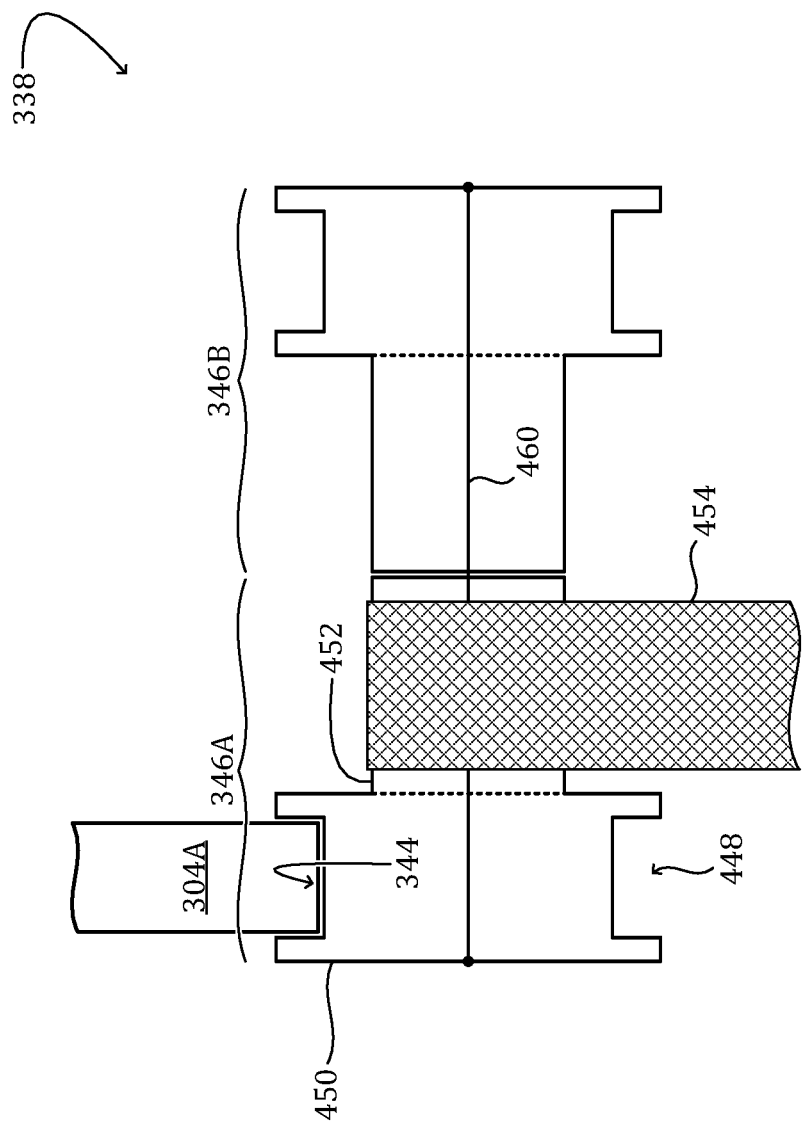
FIGS. 4 and 5 shows aspects of an example conveyor of an optical read system.

In the example shown in FIG. 3, conveyor 338 includes a plurality of rollers 346 that make slideless contact with edge face 344 of optical substrate 304A. FIG. 4 provides a more detailed view of the roller system in one, non-limiting example. Rollers 346A in FIG. 4 includes a groove 448 matched in thickness to optical substrate 304A. The term 'matched in thickness' means that the groove is slightly wider than the thickness of the optical substrate, such that the grooves of the plurality of rollers marshal the movement of the optical substrate, but without scuffing or abrading the opposing faces of the optical substrate.

Figure 5:
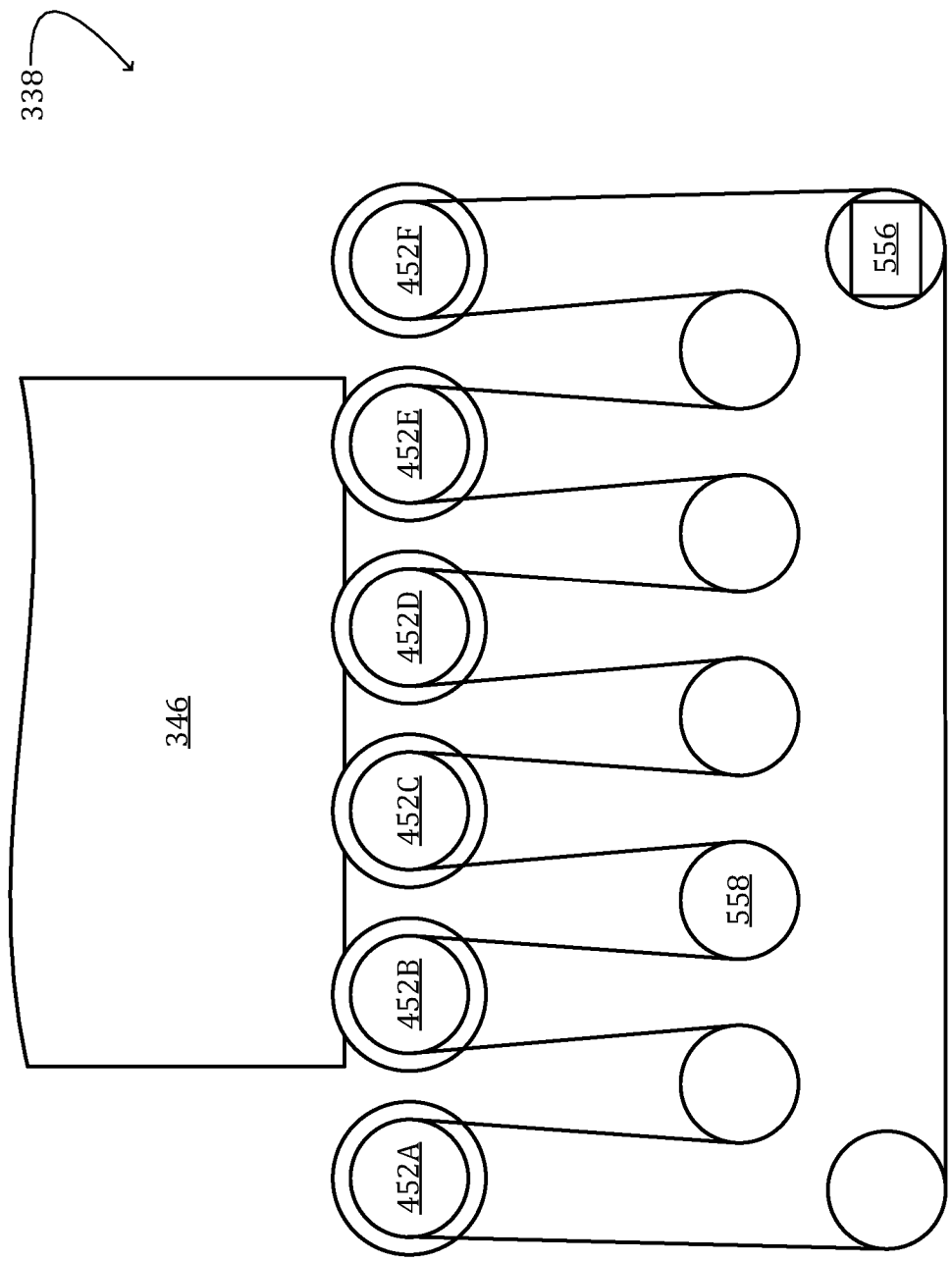

Inside groove 448, first wheel 450 is configured to make slideless contact with edge face 344 of optical substrate 304A. Roller 346A also comprises a second wheel 452 concentric with and fixed to the corresponding first wheel. As shown also in FIG. 5, the second wheel is configured to accommodate drive belt 454. Drive belt 454 wraps around second wheels 452 of each of the plurality of rollers that move optical substrate 304A. Motive force to drive the drive belt is provided by rotary motor 556 via pulleys 558. For ease of illustration the drawings show a smooth drive belt and smooth second wheels and pulleys. In some examples, however, the interior surface of the drive belt is toothed and the second wheels are notched, such that the rotation of each roller stays registered to the travel of the drive belt.

In the illustrated examples, FIG. 3 shows a second optical substrate 304B, and FIG. 4 shows a corresponding second roller 346B. Moreover, both rollers 346 are arranged on an axle 460. In general, two or more rollers arranged on the same axle enable the conveyor to move two or more optical substrates along parallel lanes, as described in greater detail hereinafter. In examples where a second roller is arranged on a given axle, the second wheel of that roller may be driven independently, by a different drive belt (not shown in the drawings).

Returning now to FIG. 3, optical system 340 comprises an optical probe portion 362 and a camera portion 364. The camera portion comprises an objective lens and camera, and the optical probe portion comprises an optical source, as described hereinabove. Camera portion 364 has a field-of-view 366 and is configured to observe one or more waveplates 342 in the field-of-view. The optical system is mechanically coupled to at least one positioner 368A. The positioner is configured to move at least a portion of the optical system in a second direction along which waveplates 342 may be arranged—viz., the Y direction in FIG. 3. Thus, the movement effected by the positioner displaces the field-of-view along the second direction.

In the illustrated example positioner 368A is further configured to move at least a portion of the optical system in a third direction non-parallel to the first and second directions and along which waveplates 342 may also be arranged—viz., the Z direction in FIG. 3. In examples in which waveplates are arranged in optical substrate 304A in layers of increasing depth, movement of the optical system in the third direction may bring a desired layer into focus, thereby determining which of the waveplates are observed. The first, second, and third directions may be mutually perpendicular in some examples, but that aspect is not strictly necessary.

The configuration of positioner 368A may vary from one example to another. In some examples positioner 368A includes an independent linear motor for each direction in which the optical system is moved. The positioner may take the form of a YZ translational stage, in some examples.

In the example illustrated in FIG. 3, optical-probe portion 362 and camera portion 364 each has its own positioner 368: the camera portion 364 is coupled to first positioner 368A, and the optical-probe portion 362 is coupled to second positioner 368B. Each positioner is configured to move its respective optical component in at least the second direction, or in the second and third directions, depending on the detailed configuration.

Controller 124 is coupled operatively to conveyor 338 and to positioners 368A and 368B. The controller is configured to vary, in the first and second directions, the relative position of optical system 340 versus optical substrate 304A. In this way the controller controls which of the plurality of waveplates are observed by the optical system. In some examples the position control effected by controller 124 may be achieved in a closed-loop manner. For example, optical substrate 304A may include a plurality of registration marks 370. Optical system 340 may be further configured to resolve the registration marks, and the controller may be configured to control the conveyor and one or more positioners in a closed-loop manner, based on resolution of the registration marks.

Figure 6:
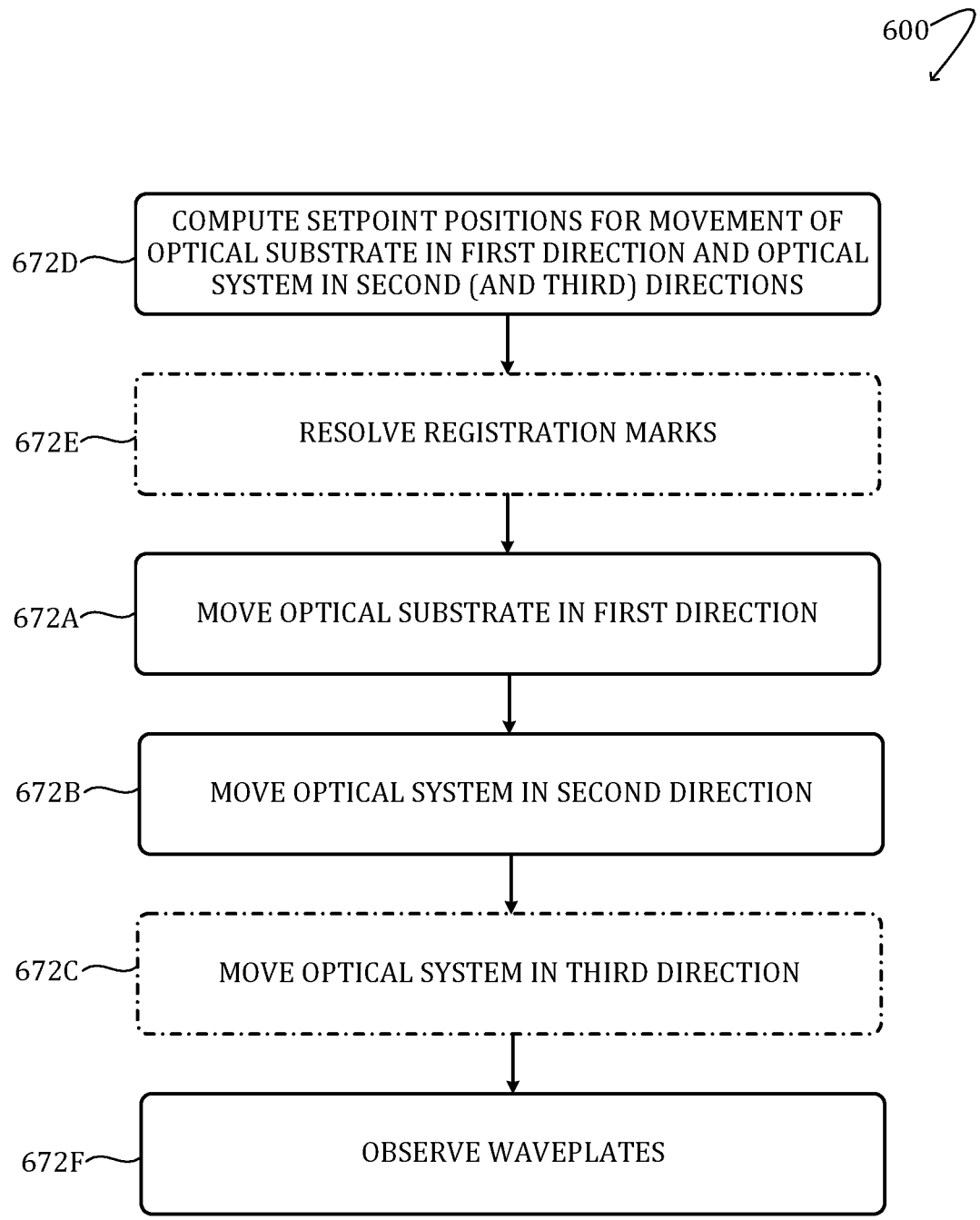
FIG. 6 shows aspects of example method to read data encoded optically within an optical substrate.

FIG. 6 shows aspects of an example method 600 to read data encoded optically within an optical substrate.

At 672A of method 600 a conveyor moves an optical substrate in a first direction. As noted hereinabove, the optical substrate includes a plurality of waveplates arranged along the first direction and along a second direction non-parallel to the first direction. In some examples moving the optical substrate includes rolling the optical substrate over a plurality of rollers. In some examples the method further comprises driving the plurality of rollers with a drive belt.

At 672B one or more positioners move an optical system in the second direction. As noted hereinabove the camera portion of the optical system has a field-of-view and is configured to observe one or more of the waveplates in the field-of-view. Accordingly, the act of moving the optical system displaces the field-of-view along the second direction.

At 672C the one or more positioners move the optical system in a third direction non-parallel to the first and second directions. As the plurality of waveplates may be arranged further along the third direction, in some examples, movement of the optical system in the third direction determines which of the one or more waveplates are observed. In some examples the first, second, and third directions are mutually perpendicular directions.

In method 600 movement of the optical substrate and optical system are controlled so as to vary, at least in the first and second directions, the relative position of the optical system versus the optical substrate, thereby controlling which of the plurality of waveplates are observed. To that end, a controller computes, at 672D, setpoint positions for movement of the optical substrate in the first direction and for movement of the optical system in the second (and optionally third) direction. As noted above the optical substrate may include a plurality of registration marks. Accordingly, method 600 may further comprise, at 672E resolving the registration marks, such that at 672C the setpoint positions for the conveyor and the one or more positioners may be set in a closed-loop manner based on a location of the registration marks as resolved. At 672F one or more waveplates are observed in the field-of-view of the camera portion of the optical system.

Figure 7:
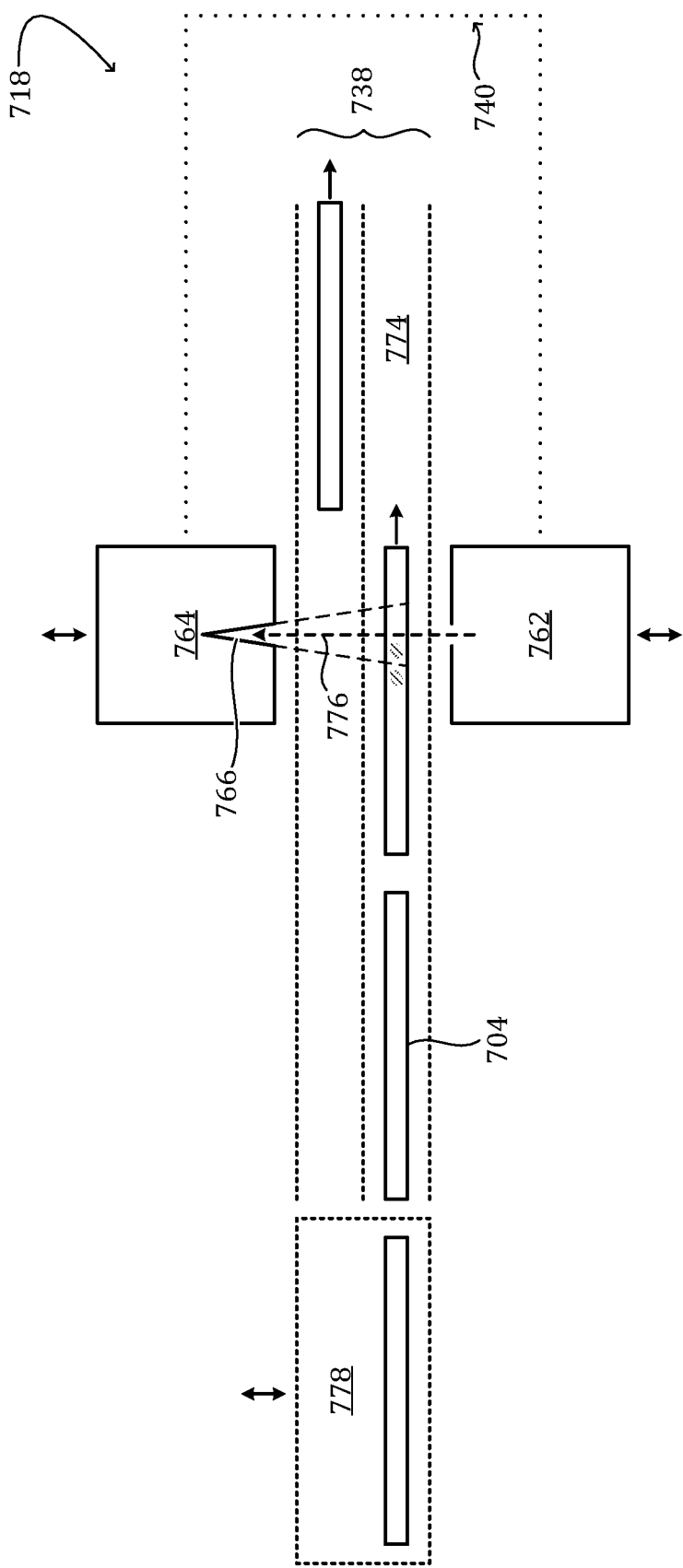
FIG. 7 shows aspects of another example optical data reader.

As shown in FIG. 4, by arranging two or more rollers 346 on the same axis 460 it becomes possible for conveyor 338 to guide optical substrates 346 through the optical data reader along plural lanes. In some examples the plural lanes may be substantially parallel, at least in the vicinity of the optical system. FIG. 7 shows, schematically in plan view, selected aspects of an optical data reader so configured. Optical data reader 718 includes a conveyor 738, an optical system 740, and a shuttle 778, in addition to a suitable controller, such as read controller 124 of FIG. 1.

Conveyor 738 is configured to move a plurality of optical substrates 704 along a plurality of lanes 774. In some examples each of the plurality of lanes accommodates two or more optical substrates moving in series. Again, each optical substrate includes a plurality of waveplates arranged along a direction of movement of the optical substrate within any lane.

As described hereinabove, the plurality of waveplates may be arranged also in second and/or third directions, in some examples, mutually non-parallel and non-parallel also to the first direction. Accordingly, optical system 740 may be mechanically coupled to one or more positioners configured to move the optical system in the second and/or third direction, thereby displacing the field-of-view of the optical system along the second direction and/or third direction.

Generally speaking, a part of each lane 774 of conveyor 738 is configured to make slideless contact with an area of optical substrate 704. In more particular examples each lane of the conveyor includes a plurality of rollers, as shown in FIG. 4. Each of the plurality of rollers may include a groove suitably matched in thickness to the optical substrate. Inside the groove, a first wheel may be configured to make slideless contact with an edge face or other area of the optical substrate. In some examples each of the plurality of rollers may comprise a second wheel concentric with and fixed to the first wheel and configured to accommodate a drive belt. In some examples conveyor 738 may comprise, for each of the plurality of lanes 774, a motor with pulleys, configured to drive the drive belt. To support movement of the optical substrate in plural lanes, each of the plurality of rollers may include an axle, wherein a corresponding roller for each of the plurality of lanes is arranged on the axle.

Continuing in FIG. 7, optical system 740 comprises an optical probe portion 762 and a camera portion 764. The camera portion has a field-of-view 766 arranged about an optical axis 776. The camera portion is aligned to optical axis 776 on a first side of the plurality of lanes 774, and the optical-probe portion is aligned to the optical axis on a side opposite the first side of the plurality of lanes, such that optical axis 776 crosses the plurality of lanes 774. The optical system is configured to observe one or more of the waveplates in its field-of-view; movement of an optical substrate along at least one lane brings one or more different waveplates into the field-of-view.

Shuttle 778 is configured to insert at least one optical substrate 704 into at least one of the plurality of lanes 774. In the illustrated example the shuttle is arranged at one end of conveyor 738. Other examples may include a shuttle at both ends, or, the conveyor may take the form of an endless loop into which optical substrates are inserted and withdrawn at any suitable location.

In some examples shuttle 778 is a robotic system that transports optical substrates back and forth between optical data reader 718 and an optical-substrate repository. In some examples the shuttle may transport optical substrates between an optical data writer and an optical data reader, for routine verification of the write process.

The read controller is coupled operatively to conveyor 738 and shuttle 778 and configured to control the position of each optical substrate 704 in each occupied lane. In some examples the controller is also coupled operatively to the one or more positioners and configured to vary, in the first, second, and/or third directions, the relative position of the optical system versus the optical substrate in each occupied lane, thereby controlling which of the plurality of waveplates is observed.

Figure 8:
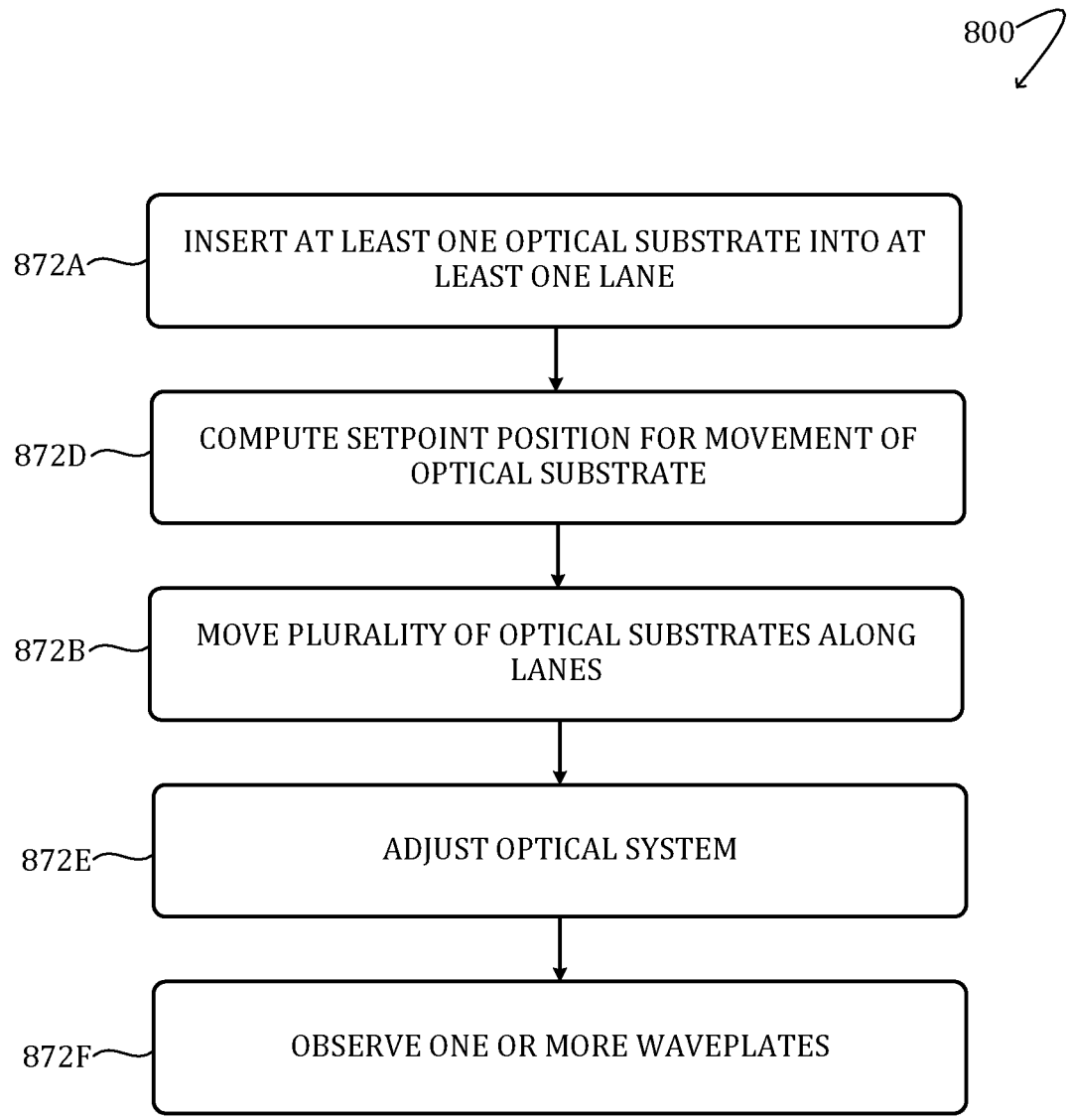
FIG. 8 shows aspects of an example method to read data encoded optically within an optical substrate.

FIG. 8 shows aspects of an example method 800 to read data encoded optically within an optical substrate.

At 872A of method 800, a shuttle inserts at least one optical substrate into at least one of the plurality of lanes of a conveyor. In examples in which the shuttle is arranged at one end of the conveyor, the at least one optical substrate may be inserted at that end. In other examples the optical substrate may be inserted at either end or at any suitable location within loop-like lanes of the conveyor.

At 872B the conveyor moves a plurality of optical substrates along a plurality of lanes. As noted hereinabove, each optical substrate includes a plurality of waveplates arranged along a direction of movement of the optical substrate within any of the plurality of lanes.

In some examples moving the plurality of optical substrates comprises moving two or more optical substrates in series in a given lane. In some examples moving the plurality of optical substrates comprises moving two or more optical substrates concurrently in different lanes. In some examples moving the plurality of optical substrates comprises moving over a plurality of rollers, or between opposing series of rollers. In some examples moving the plurality of optical substrates comprises guiding through a groove in a roller matched in thickness to the optical substrate, as described above.

At 872C an optical system of the optical data reader observes one or more of the waveplates in a field-of-view arranged about an optical axis. The optical axis crosses the plurality of lanes, such that movement of at least one of optical substrates along the lane brings one or more different waveplates into the field-of-view.

In method 800 the movement of the optical substrate is controlled so as to control the position of the optical substrate in each occupied lane. To that end, a controller computes, at 872D of method 800, setpoint position for movement of the optical substrate through the conveyor in the first direction. At 872E the optical system is adjusted for observation of the desired one or more waveplates. That function may include actuating the positioners to which portions of the optical system are coupled—e.g., to appropriately position the optical-probe and/or camera portions. At 872F one or more waveplates are observed in the field-of-view of the camera portion of the optical system.

As noted hereinabove, method 800 is applicable to data storage and retrieval systems in which a significant portion of the bandwidth is used to verify newly written data. In such a system, the rate of demand for access of pre-existing data may be relatively low. When such demand occurs, however, it can be met with minimal latency. Moreover, a given optical substrate can be loaded into a holding position and queued for reading even while the reader is engaged in verifying another substrate, for reduced latency through pipelining.

The control methods herein may be tied to a computer system of one or more computing devices. Such methods and processes may be implemented as an application program or service, an application programming interface (API), a library, and/or other computer-program product.

Figure 9:
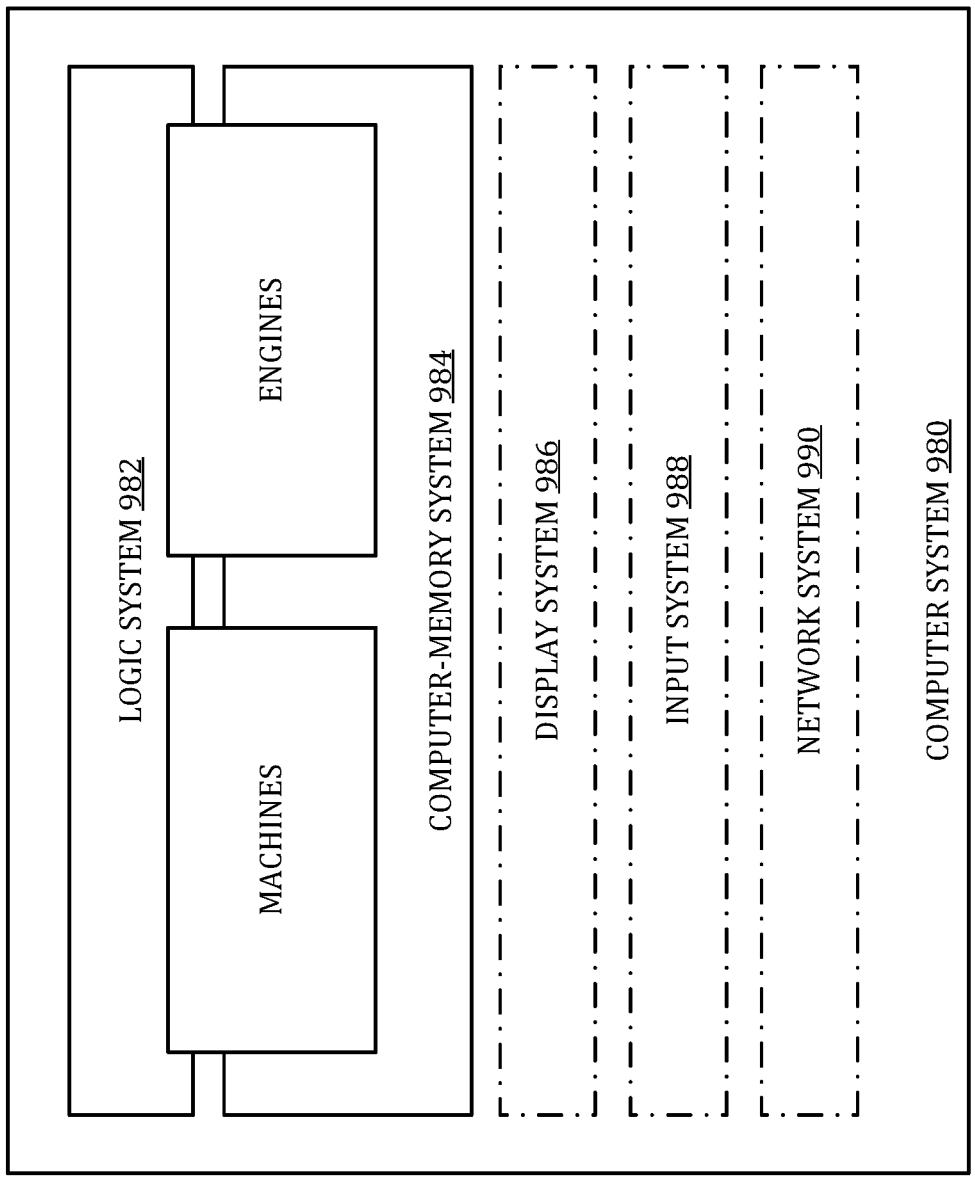
FIG. 9 shows aspects of an example computer system.

FIG. 9 provides a schematic representation of a computer system 980 configured to provide some or all of the controller, encoder, and decoder functionality disclosed herein. Computer system 980 may take the form of a personal computer, application-server computer, or any other computing device.

Computer system 980 includes a logic system 982 and a computer-memory system 984. Computer system 980 may optionally include a display system 986, an input system 988, a network system 990, and/or other systems not shown in the drawings.

Logic system 982 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 984 includes at least one physical device configured to temporarily and/or permanently hold computer system information, such as data and instructions executable by logic system 982. When the computer-memory system includes two or more devices, the devices may be collocated or remotely located. Computer-memory system 984 may include at least one volatile, nonvolatile, dynamic, static, read/write, read-only, random-access, sequential-access, location-read addressable, file-read addressable, and/or content-read addressable computer-memory device. Computer-memory system 984 may include at least one removable and/or built-in computer-memory device. When the logic system executes instructions, the state of computer-memory system 984 may be transformed—e.g., to hold different data.

Aspects of logic system 982 and computer-memory system 984 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 982 and computer-memory system 984 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines (as used throughout the above description) may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 986 may be used to present a visual representation of data held by computer-memory system 984. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 988 may comprise or interface with one or more input devices. An input device may include a sensor device or a user input device. Examples of user input devices include a keyboard, mouse, or touch screen.

When included, network system 990 may be configured to communicatively couple computer system 980 with one or more other computer systems. The network system may include wired and/or wireless communication devices compatible with one or more different communication protocols. The network system may be configured for communication via personal-, local- and/or wide-area networks.

In conclusion, one aspect of this disclosure is directed to an optical data reader comprising a conveyor, an optical system, and a controller. The conveyor is configured to move a plurality of optical substrates along a plurality of lanes. Each optical substrate includes a plurality of waveplates arranged along a direction of movement of the optical substrate within any of the plurality of lanes. The optical system has a field-of-view about an optical axis and is configured to observe one or more of the waveplates in the field-of-view. The optical axis crosses the plurality of lanes such that movement of at least one of the optical substrates brings one or more different waveplates into the field-of-view. The controller is coupled operatively to the conveyor and configured to control a position of the optical substrate in each occupied lane.

In some implementations the optical data reader further comprises a shuttle configured to insert at least one optical substrate into at least one of the plurality of lanes. In some implementations the shuttle is arranged at an end of the conveyor. In some implementations each of the plurality of lanes accommodates two or more optical substrates in series. In some implementations the optical system includes an optical sensor aligned to the optical axis on a first side of the plurality of lanes, and a light source aligned to the optical axis on a side opposite the first side of the plurality of lanes. In some implementations part of each lane of the conveyor is configured to make slideless contact with an area of the optical substrate. In some implementations each lane of the conveyor includes a plurality of rollers. In some implementations each of the plurality of rollers includes a groove matched in thickness to the optical substrate and, inside the groove, a wheel configured to make slideless contact with an edge face of the optical substrate. In some implementations the wheel is a first wheel, and each of the plurality of rollers comprises a second wheel concentric with and fixed to the first wheel and configured to accommodate a drive belt. In some implementations the optical data reader further comprises, for each of the plurality of lanes, a motor and pulley configured to drive the drive belt. In some implementations each of the plurality of rollers includes an axle and a corresponding roller for each of the plurality of lanes is arranged on the axle.

Another aspect of this disclosure is directed to a method to read data encoded optically within an optical substrate. The method comprises: (a) moving a plurality of optical substrates along a plurality of lanes, each optical substrate including a plurality of waveplates arranged along a direction of movement of the optical substrate within any of the plurality of lanes; (b) observing one or more of the waveplates in a field-of-view of an optical system arranged about an optical axis, the optical axis crossing the plurality of lanes such that movement of at least one of the optical substrates brings one or more different waveplates into the field-of-view; and (c) controlling the conveyor so as to control a position of the optical substrate in each occupied lane.

In some implementations the method further comprises inserting at least one optical substrate into at least one of the plurality of lanes. In some implementations inserting the at least one optical substrate comprises inserting at an end of the conveyor. In some implementations moving the plurality of optical substrates comprises moving two or more optical substrates in series in a given lane. In some implementations moving the plurality of optical substrates comprises moving two or more optical substrates concurrently in different lanes. In some implementations moving the plurality of optical substrates comprises moving over a plurality of rollers. In some implementations moving the plurality of optical substrates comprises guiding through a groove in a roller matched in thickness to the optical substrate.

Another aspect of this disclosure is directed to an optical data reader comprising a conveyor, an optical system, and a controller. The conveyor is configured to move a plurality of optical substrates along a plurality of lanes in a first direction. Each optical substrate includes a plurality of waveplates arranged along the first direction and along a second direction non-parallel to the first direction. The optical system has a field-of-view about an optical axis and configured to observe one or more of the waveplates in the field-of-view. The optical axis crosses the plurality of lanes and the optical system mechanically coupled to a positioner configured to move the optical system in the second direction, thereby displacing the field-of-view along the second direction. The controller is coupled operatively to the conveyor and to the positioner and configured to control a relative position of the optical system versus the optical substrate in each occupied lane.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. In that spirit, the phrase 'based at least partly on' is intended to remind the reader that the functional and/or conditional logic illustrated herein neither requires nor excludes suitable additional logic, executing in combination with the illustrated logic, to provide additional benefits.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An optical data reader comprising:
   a conveyor configured to move a plurality of optical substrates along a plurality of lanes, each optical substrate including a plurality of waveplates arranged along a direction of movement of the optical substrate within any of the plurality of lanes;
   an optical system having a field-of-view about an optical axis and configured to observe one or more of the waveplates in the field-of-view, the optical axis crossing the plurality of lanes such that movement of at least one of the optical substrates brings one or more different waveplates into the field-of-view; and
   a controller coupled operatively to the conveyor and configured to control a position of the optical substrate in each occupied lane.

2. The optical data reader of claim 1 further comprising a shuttle configured to insert at least one optical substrate into at least one of the plurality of lanes.

3. The optical data reader of claim 1 wherein the shuttle is arranged at an end of the conveyor.

4. The optical data reader of claim 1 wherein each of the plurality of lanes accommodates two or more optical substrates in series.

5. The optical data reader of claim 1 wherein the optical system includes an optical sensor aligned to the optical axis on a first side of the plurality of lanes, and a light source aligned to the optical axis on a side opposite the first side of the plurality of lanes.

6. The optical data reader of claim 1 wherein part of each lane of the conveyor is configured to make slideless contact with an area of the optical substrate.

7. The optical data reader of claim 1 wherein each lane of the conveyor includes a plurality of rollers.

8. The optical data reader of claim 7 wherein each of the plurality of rollers includes a groove matched in thickness to the optical substrate and, inside the groove, a wheel configured to make slideless contact with an edge face of the optical substrate.

9. The optical data reader of claim 8 wherein the wheel is a first wheel, and wherein each of the plurality of rollers comprises a second wheel concentric with and fixed to the first wheel and configured to accommodate a drive belt.

10. The optical data reader of claim 9 further comprising, for each of the plurality of lanes, a motor and pulley configured to drive the drive belt.

11. The optical data reader of claim 8 wherein each of the plurality of rollers includes an axle and wherein a corresponding roller for each of the plurality of lanes is arranged on the axle.

12. A method to read data encoded optically within an optical substrate, the method comprising:
    moving a plurality of optical substrates along a plurality of lanes, each optical substrate including a plurality of waveplates arranged along a direction of movement of the optical substrate within any of the plurality of lanes;
    observing one or more of the waveplates in a field-of-view of an optical system arranged about an optical axis, the optical axis crossing the plurality of lanes such that movement of at least one of the optical substrates brings one or more different waveplates into the field-of-view; and
    controlling the conveyor so as to control a position of the optical substrate in each occupied lane.

13. The method of claim 12 further comprising inserting at least one optical substrate into at least one of the plurality of lanes.

14. The method of claim 12 wherein inserting the at least one optical substrate comprises inserting at an end of the conveyor.

15. The method of claim 12 wherein moving the plurality of optical substrates comprises moving two or more optical substrates in series in a given lane.

16. The method of claim 12 wherein moving the plurality of optical substrates comprises moving two or more optical substrates concurrently in different lanes.

17. The method of claim 12 wherein moving the plurality of optical substrates comprises moving over a plurality of rollers.

18. The method of claim 17 wherein moving the plurality of optical substrates comprises guiding through a groove in a roller.

19. The method of claim 18, wherein the groove is matched in thickness to the optical substrate.

20. An optical data reader comprising:
    a conveyor configured to move a plurality of optical substrates along a plurality of lanes in a first direction, each optical substrate including a plurality of waveplates arranged along the first direction and along a second direction non-parallel to the first direction;
    an optical system having a field-of-view about an optical axis and configured to observe one or more of the waveplates in the field-of-view, the optical axis crossing the plurality of lanes and the optical system mechanically coupled to a positioner configured to move the optical system in the second direction, thereby displacing the field-of-view along the second direction; and
    a controller coupled operatively to the conveyor and to the positioner and configured to control a relative position of the optical system versus the optical substrate in each occupied lane.

* * * * *